US011639762B2

(12) United States Patent
Chung

(10) Patent No.: US 11,639,762 B2
(45) Date of Patent: May 2, 2023

(54) ARTICULATING FAUCET

(71) Applicant: Kohler Co., Kohler, WI (US)

(72) Inventor: Chanseol Chung, Shanghai (CN)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/813,246

(22) Filed: Jul. 18, 2022

(65) Prior Publication Data

US 2022/0349506 A1 Nov. 3, 2022

Related U.S. Application Data

(63) Continuation of application No. 16/284,769, filed on Feb. 25, 2019, now Pat. No. 11,408,543.

(60) Provisional application No. 62/636,322, filed on Feb. 28, 2018.

(51) Int. Cl.
*F16L 27/08* (2006.01)
*E03C 1/04* (2006.01)
*F16L 9/22* (2006.01)
*F16L 37/00* (2006.01)
*F16K 27/00* (2006.01)
*F16L 27/02* (2006.01)
*F16L 11/18* (2006.01)
*F16L 27/087* (2006.01)

(52) U.S. Cl.
CPC ........ *F16L 27/0849* (2013.01); *E03C 1/0404* (2013.01); *F16K 27/00* (2013.01); *F16L 9/22* (2013.01); *F16L 27/023* (2013.01); *F16L 37/004* (2013.01); *E03C 2001/0414* (2013.01); *F16L 11/18* (2013.01); *F16L 27/087* (2013.01)

(58) Field of Classification Search
CPC ... F16L 27/0849; F16L 27/023; F16L 27/087; F16L 9/22; F16L 37/004; F16L 11/08; E03C 1/0404; E03C 2001/0414; F16K 27/00
See application file for complete search history.

(56) References Cited

U.S. PATENT DOCUMENTS

| 1,138,187 A | 5/1915 | Bridges |
| 1,255,577 A | 2/1918 | Berry |
| 1,276,117 A | 8/1918 | Riebe |
| 1,894,390 A | 1/1933 | Banks |
| 2,696,264 A | 12/1954 | Colmerauer |
| 2,878,059 A | 3/1959 | Limle |
| 2,953,970 A | 9/1960 | Maynard |
| 3,181,895 A | 5/1965 | Gator |

(Continued)

FOREIGN PATENT DOCUMENTS

| CN | 2777304 | 5/2003 |
| CN | 201322115 Y | 10/2009 |

(Continued)

OTHER PUBLICATIONS

Chinese First Office Action on CN Appl. Ser. No. 201910476155.5 dated Jul. 15, 2020 (15 pages).

(Continued)

*Primary Examiner* — Patrick C Williams
(74) *Attorney, Agent, or Firm* — Patterson Thuente, P.A.

(57) ABSTRACT

A water delivery device includes a first conduit section and a second conduit section rotatably coupled to the first conduit section by a magnetic joint. The magnetic joint includes a plurality of magnets that cooperatively define a plurality of rotational positions between the first conduit section and the second conduit section.

19 Claims, 13 Drawing Sheets

(56) References Cited

U.S. PATENT DOCUMENTS

| | | |
|---|---|---|
| 3,674,014 A | 7/1972 | Tillander |
| 4,004,298 A | 1/1977 | Freed |
| 4,054,128 A | 1/1977 | Seufert et al. |
| 4,049,295 A | 9/1977 | Piers |
| 4,158,462 A | 6/1979 | Coral |
| 4,338,937 A | 7/1982 | Lerman |
| 4,351,323 A | 9/1982 | Ouchi et al. |
| 4,735,357 A | 4/1988 | Gregory et al. |
| 4,768,557 A | 9/1988 | Holzer |
| 4,807,370 A | 2/1989 | Trimble |
| 5,062,164 A | 11/1991 | Lee et al. |
| 5,342,018 A | 8/1994 | Wu |
| 5,667,146 A | 9/1997 | Pimentel et al. |
| 5,755,262 A | 5/1998 | Pilolla |
| 5,865,378 A | 2/1999 | Hollinshead et al. |
| 5,868,311 A | 2/1999 | Cretu-Petra |
| 5,979,487 A | 11/1999 | Devehat |
| 6,164,570 A | 12/2000 | Smeltzer |
| 6,626,210 B2 | 9/2003 | Luettgen et al. |
| 6,648,376 B2 | 11/2003 | Christianson |
| 6,715,491 B2 | 4/2004 | Cooper et al. |
| 6,854,768 B2 | 2/2005 | Elder |
| 7,019,433 B2 | 3/2006 | Hashimoto et al. |
| 7,326,350 B2 | 2/2008 | Mueller et al. |
| 7,383,611 B2 | 6/2008 | Foster |
| 7,637,905 B2 | 12/2009 | Saadat et al. |
| 7,669,899 B2 | 3/2010 | Carson |
| 7,793,987 B1 | 9/2010 | Busch et al. |
| 7,909,636 B2 | 3/2011 | Brodeur |
| 8,024,822 B2 | 9/2011 | Magan et al. |
| 8,191,580 B2 | 6/2012 | Scott |
| 8,210,572 B2 | 7/2012 | Davis |
| 8,376,865 B2 | 2/2013 | Forster et al. |
| 8,413,686 B2 | 4/2013 | Ko |
| 8,608,502 B2 | 12/2013 | Witter et al. |
| 9,093,206 B2 | 7/2015 | Davis |
| 9,198,561 B2 | 12/2015 | Smith et al. |
| 9,272,171 B2 | 3/2016 | Kolacz et al. |
| 9,315,975 B2 | 4/2016 | Davidson et al. |
| 9,377,156 B2 | 6/2016 | Wong |
| 9,649,881 B2 | 5/2017 | Warncke et al. |
| 9,803,787 B2 | 10/2017 | Scott et al. |
| 9,849,551 B2 | 10/2017 | Ebihara et al. |
| 10,492,552 B2 | 12/2019 | Jaeger et al. |
| 2004/0154673 A1 | 8/2004 | Mascari et al. |
| 2005/0103903 A1 | 5/2005 | Shamir et al. |
| 2005/0133545 A1 | 6/2005 | Find |
| 2005/0283904 A1 | 12/2005 | Magan et al. |
| 2006/0192161 A1 | 8/2006 | Kuna et al. |
| 2007/0044232 A1 | 3/2007 | McNerney et al. |
| 2008/0187393 A1 | 8/2008 | Nellessen |
| 2009/0293238 A1 | 12/2009 | Davis |
| 2010/0307497 A1 | 12/2010 | Busch et al. |
| 2011/0038064 A1 | 2/2011 | Xhunga |
| 2011/0162743 A1 | 7/2011 | Nelson |
| 2012/0024412 A1 | 2/2012 | Bertelo et al. |
| 2012/0319313 A1 | 12/2012 | Davis |
| 2013/0276923 A1 | 10/2013 | Wolff et al. |
| 2013/0285365 A1 | 10/2013 | Davis |
| 2014/0166124 A1 | 6/2014 | Davidson et al. |
| 2014/0235361 A1 | 8/2014 | Forster et al. |
| 2014/0318650 A1 | 10/2014 | Wolff et al. |
| 2015/0308087 A1 | 10/2015 | Zhu et al. |
| 2016/0109046 A1 | 4/2016 | Lee et al. |
| 2016/0208580 A1 | 7/2016 | Delzell et al. |
| 2016/0215482 A1 | 7/2016 | Fourman et al. |
| 2017/0074441 A1 | 3/2017 | Erickson et al. |
| 2019/0037322 A1 | 1/2019 | Santek et al. |
| 2019/0264838 A1 | 8/2019 | Chung et al. |
| 2019/0264848 A1 | 8/2019 | Chung |
| 2019/0264849 A1 | 8/2019 | Chung |
| 2019/0368172 A1 | 8/2019 | Chung |
| 2019/0372322 A1 | 12/2019 | Tseng |

FOREIGN PATENT DOCUMENTS

| | | |
|---|---|---|
| CN | 102007330 A | 4/2011 |
| CN | 203453524 U | 2/2014 |
| CN | 204628724 U | 9/2015 |
| CN | 105822791 A | 8/2016 |
| EP | 2378011 | 10/2011 |
| EP | 2896759 B1 | 7/2015 |
| EP | 3043000 | 7/2016 |
| GB | 983278 | 2/1965 |
| GB | 0983278 | 2/1965 |
| GB | 2431085 | 4/2007 |
| KR | 20110136087 A | 12/2011 |
| WO | WO-2012/075593 | 6/2012 |
| WO | WO-2013/093521 | 6/2013 |
| WO | WO-2015/010251 A1 | 1/2015 |

OTHER PUBLICATIONS

Chinese First Office Action on CN Appl. Ser. No. 201910476937.9 dated Dec. 1, 2020 (12 pages).
Chinese Second Office Action on CN Appl. Ser. No. 201910476155.5 dated Mar. 9, 2021 (13 pages).
Chinese Third Office Action on CN Appl. Ser. No. 201910152115.5 dated Jul. 8, 2021 (10 pages).
Second Office Action CN Application No. 201910152115.5 dated Jan. 1, 2021 4 pages.
Extended European Search Report on Application No. 19159584.2 dated Jul. 15, 2019 (8 pages).
Extended European Search Report on EP 19159567.7 dated Jun. 27, 2019 (9 pages).
Extended European Search Report on EP 19159570.1 dated Jul. 1, 2019 (9 pages).
Extended European Search Report on EP 19159584.2 dated Jul. 15, 2019 (8 pages).
First Action on Chinese Appln. Ser. No. 201910152115.5 dated May 22, 2020 (1O pages).
First Action on Chinese Appln. Ser. No. 201910153128.4 dated May 22, 2020 (11 pages).
Extended European Search Report re Application No. 19159570.1 dated Jul. 1, 2019.

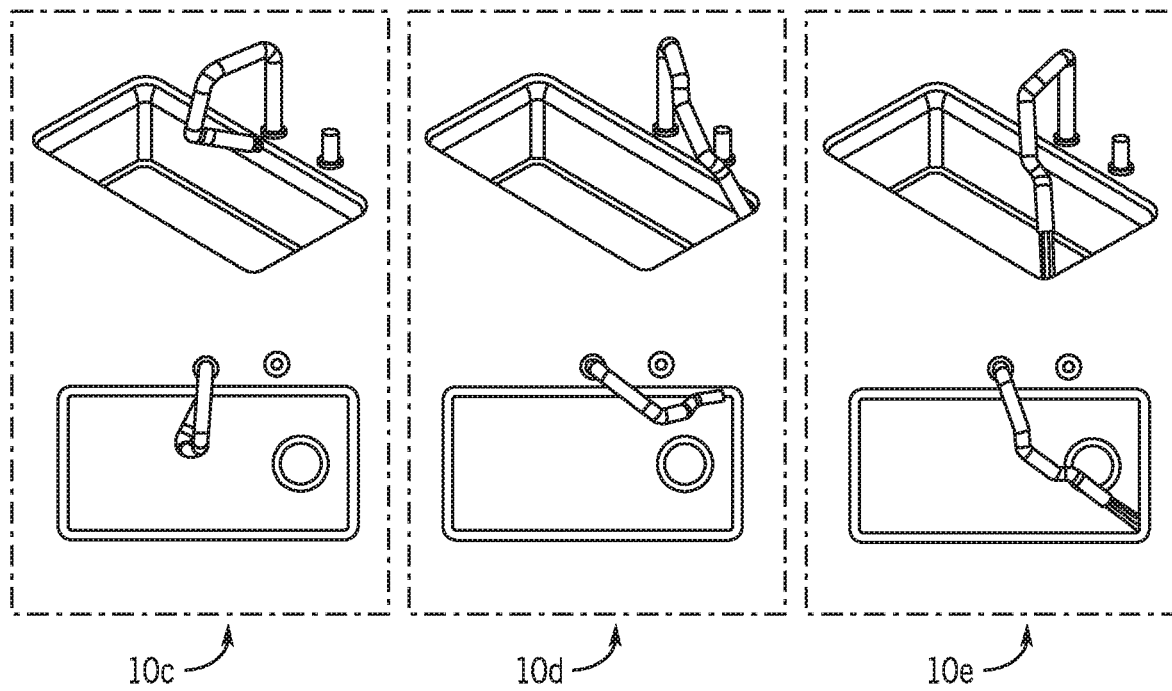
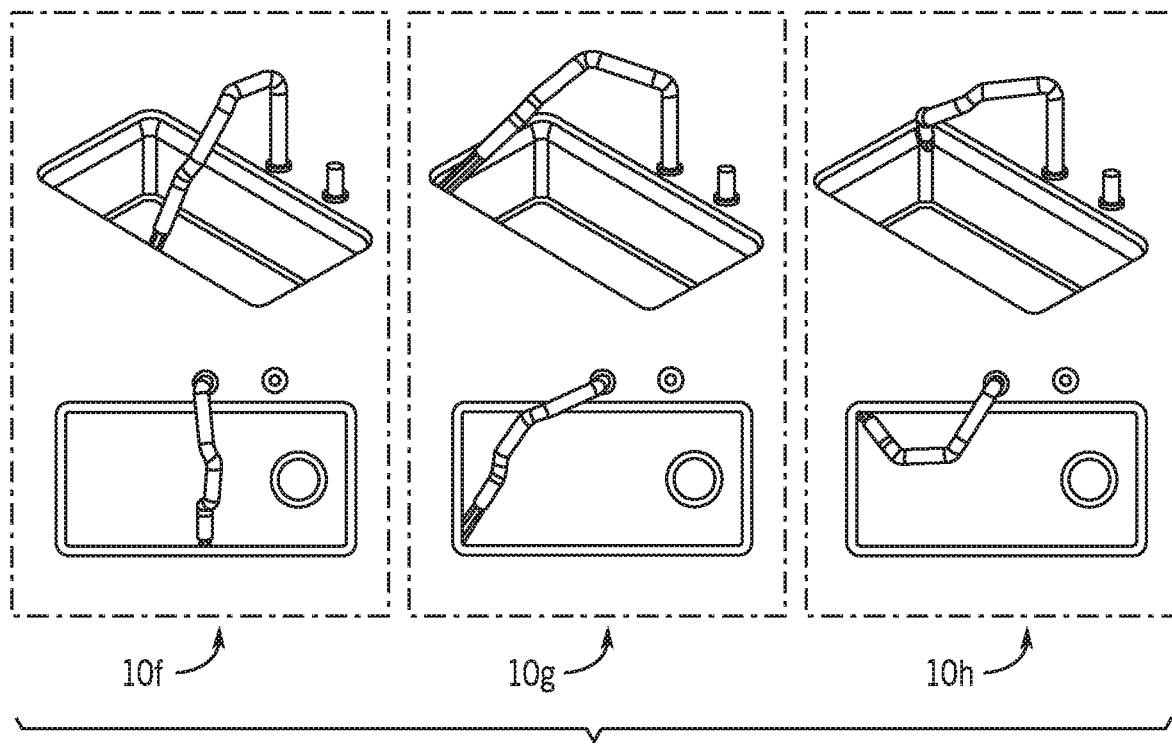
FIG. 7

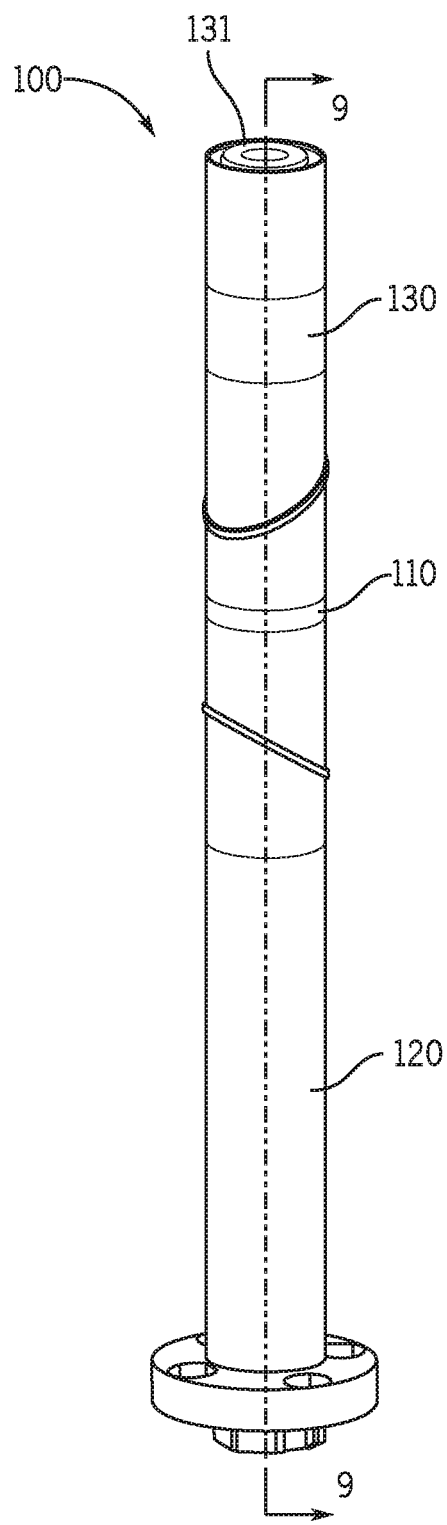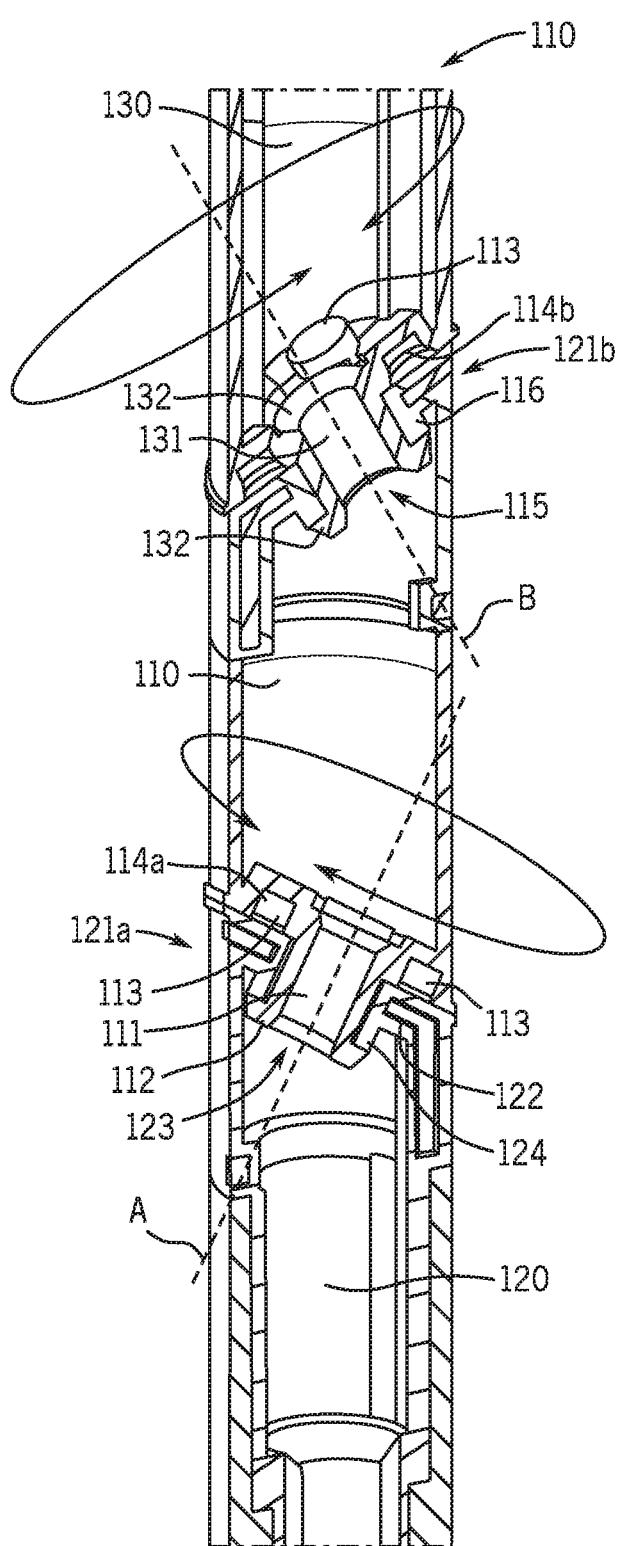

ARTICULATING FAUCET

CROSS-REFERENCE TO RELATED PATENT APPLICATION

The present application is a Continuation of U.S. application Ser. No. 16/284,769, filed Feb. 25, 2019, which claims the benefit of and priority to U.S. Provisional Application No. 62/636,322, filed Feb. 28, 2018, each of which is hereby fully incorporated herein by reference in its entirety.

BACKGROUND

The present application relates generally to water delivery devices, such as faucets and the like.

Water delivery devices, such as faucets, can include a rigid spout or conduit for directing fluid to a desired location. Generally speaking, most rigid faucet spouts have a fixed structural shape or orientation, and are not adjustable so as to change the fluid discharge location or aesthetic appearance of the spout.

SUMMARY

One embodiment of the present application relates to a water delivery device. The water delivery device includes a first conduit section, and a second conduit section rotatably coupled to the first conduit section by a magnetic joint. The magnetic joint includes a plurality of magnets that cooperatively define a plurality of rotational positions between the first conduit section and the second conduit section.

Another embodiment relates to a water delivery device. The water delivery device includes a first conduit section configured to be coupled to a mounting surface, and a second conduit section rotatably coupled to the first conduit section by a magnetic joint. The magnetic joint includes a plurality of magnets that cooperatively define a plurality of rotational positions between the first conduit section and the second conduit section.

Yet another embodiment relates to a water delivery device. The water delivery device includes a first conduit section, and a second conduit section rotatably coupled to the first conduit section by a magnetic joint. The magnetic joint includes a first plurality of magnets spaced annularly apart from each other on the first conduit section and a second plurality of magnets spaced annularly apart from each other on the second conduit section. The first plurality of magnets and the second plurality of magnets cooperatively define a plurality of rotational positions between the first conduit section and the second conduit section.

In some exemplary embodiments, the first conduit section and the second conduit section each have a length that defines a longitudinal axis, and the first conduit section has an angled interface with the second conduit section such that rotation of the second conduit section relative to the first conduit section results in changing a relative angular orientation of the longitudinal axes.

In some exemplary embodiments, the water delivery device further comprises a fluid conduit extending between the first conduit section and the second conduit section.

In some exemplary embodiments, the water delivery device is a faucet, and the first and second conduit sections collectively define a spout of the faucet.

In some exemplary embodiments, the plurality of magnets includes a first plurality of magnets and a second plurality of magnets. The magnetic joint further comprises a first member including the first plurality of magnets spaced annularly apart from each other, and a second member including the second plurality of magnets spaced annularly apart from each other. The first member is rotatably coupled to the second member. The first member is coupled to the first conduit section and the second member is coupled to the second conduit section.

In some exemplary embodiments, the second conduit section is configured to magnetically bias away from the first conduit section when the second plurality of magnets substantially overlap the first plurality of magnets, and the second conduit section is configured to magnetically bias toward the first conduit section when the second plurality of magnets substantially overlap the spaces between adjacent magnets of the first plurality of magnets.

In some exemplary embodiments, the first plurality of magnets and the second plurality of magnets are each arranged to have the same polarity facing each other.

In some exemplary embodiments, the first plurality of magnets and the second plurality of magnets are each arranged to have alternating polarities on a facing surface of the first and second members, respectively.

In some exemplary embodiments, the first plurality of magnets and the second plurality of magnets are each spaced apart equidistant from each other on the first and second members, respectively.

In some exemplary embodiments, the first member is spaced apart from the second member such that the first plurality of magnets do not physically contact the second plurality of magnets at the plurality of rotational positions.

In some exemplary embodiments, the first member further comprises a protrusion having a hollow cylindrical shape that defines a central passage, and the protrusion includes a flange portion.

In some exemplary embodiments, the protrusion rotatably couples the first member to the second member, and the flange portion retains the second member to the first member in an axial direction.

In some exemplary embodiments, the plurality of magnets includes a first plurality of magnets spaced annularly apart from each other on an end surface of the first conduit section and a second plurality of magnets spaced annularly apart from each other on an end surface of the second conduit section that faces the end surface of the first conduit section.

BRIEF DESCRIPTION OF THE DRAWINGS

FIG. 7 illustrates the water delivery device of FIG. 4 in a plurality of different configurations relative to a sink basin.

FIG. 8 is a perspective view of a faucet according to an exemplary embodiment.

FIG. 9 is a cross-sectional view of the faucet of FIG. 8.

DETAILED DESCRIPTION OF THE DRAWINGS

Figure 1:
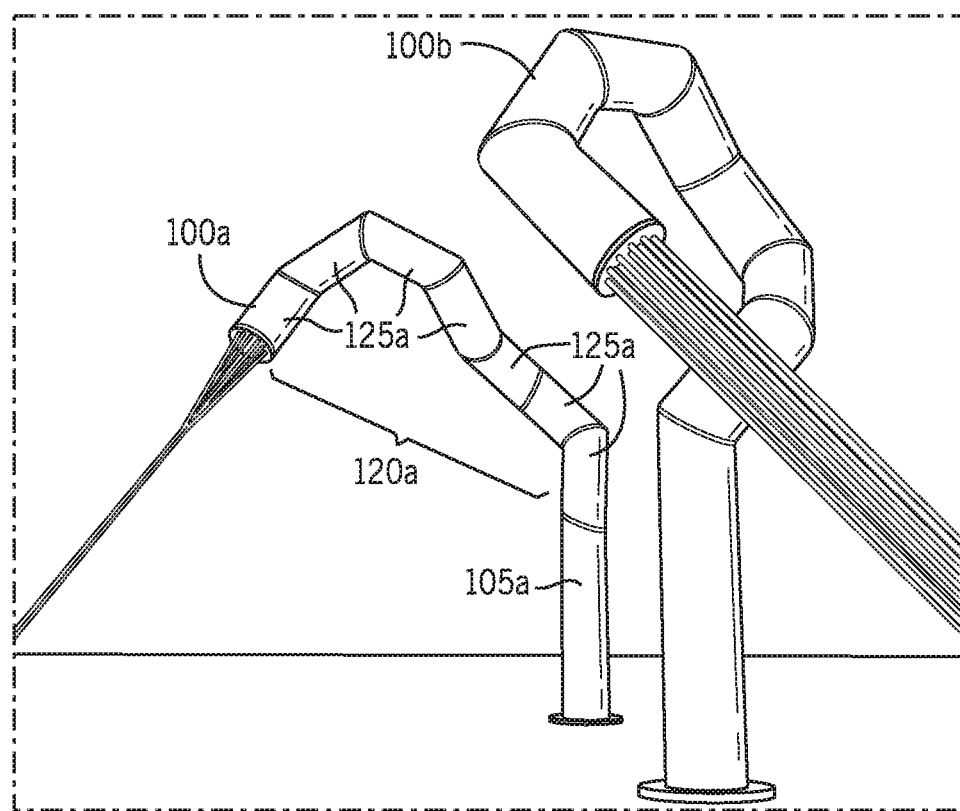
FIG. 1 is a perspective view of a faucet shown in two different orientations according to an exemplary embodiment.

Referring generally to the FIGURES, disclosed herein are water delivery devices that include a plurality of movable or articulating conduit sections to allow for reconfiguring or reorienting the shape of the device. According to various exemplary embodiments, the water delivery devices include a spout or conduit defined by a plurality of rigid conduit sections, where adjacent conduit sections are magnetically coupled to each other by a magnetic joint. In one embodiment, the magnetic joint includes a first member including a first plurality of individual magnets spaced annularly apart from each other (e.g., a first magnet array, etc.), and a second member including a second plurality of individual magnets similarly spaced annularly apart from each other (e.g., a second magnet array, etc.). The first member can be coupled to or integrally formed with an end of a first conduit section, and the second member can be coupled to or integrally formed with an end of an adjacent conduit section. Each of the conduit sections can be selectively rotated relative to adjacent conduit sections between a plurality of rotational positions that are defined by the spacing and the polarity of the magnets at the magnetic joint, so as to selectively reorient the conduit section(s) and change the overall shape of the water delivery device. This can, advantageously, allow for increased functionality of the water delivery device to, for example, fill various containers, provide access for cleaning various kitchen accessories (e.g., pots, pans, etc.), provide clearance around other structures or appliances where the water delivery device is installed, or change the overall aesthetic appearance of the water delivery device.

According to an exemplary embodiment, the magnets on one of the conduit sections can be arranged to have an opposite polarity to the magnets on an adjacent conduit section, such that the two conduit sections can be magnetically coupled to, or biased toward, each other by an attractive magnetic force when the magnets on the two conduit sections are substantially overlapping each other. According to another exemplary embodiment, the magnets can be arranged to have the same polarity when facing or substantially overlapping each other, such that the magnets repel, or bias away, from each other when rotated substantially above an opposite magnet, but can attract, or bias toward, each other when rotated to substantially overlap the spaces between the magnets (see, for example, FIG. 19).

According to another exemplary embodiment, one of the conduit sections can include a plurality of magnets arranged with alternating polarities, such that the magnets on an adjacent conduit section are attracted to the magnets having opposite polarity on the other conduit section (i.e., biased toward each other), to thereby set a relative rotational position of the two conduit sections. The magnets having the same polarity can repel each other (i.e., bias away from each other) during rotation of one of the conduit sections to set a different relative rotational position. According to various exemplary embodiments, the conduit sections do not physically contact each other at the magnet surfaces, so as to minimize the amount of friction at the joint. In this way, rotation of the two conduit sections relative to each other provides a smoother tactile response and requires less force to manually or automatically move the conduit sections (e.g., via an electromagnetic actuator, an electric motor, etc.), as compared to a conventional mechanical joint.

Figure 2:
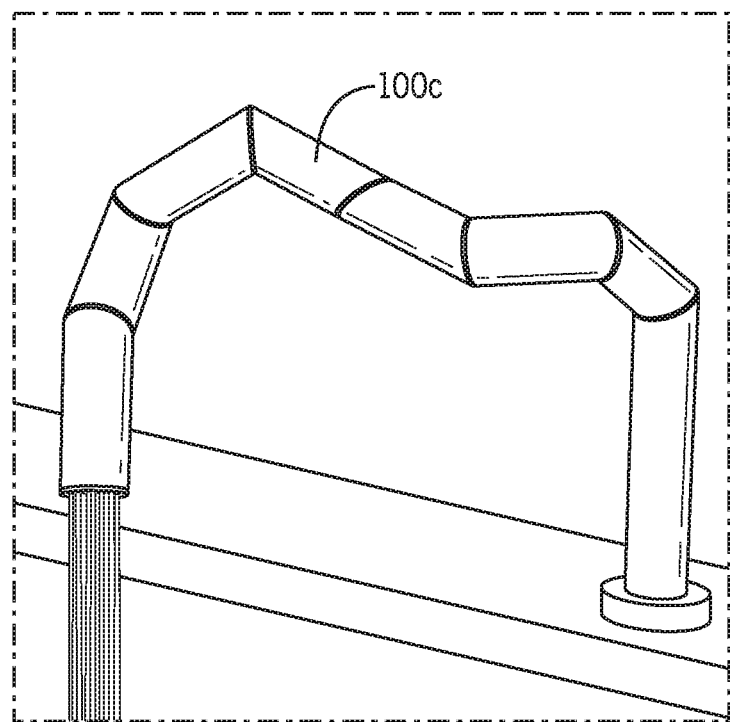
FIG. 2 is a perspective view of the faucet of FIG. 1 shown in another orientation according to another exemplary embodiment.
Figure 3:
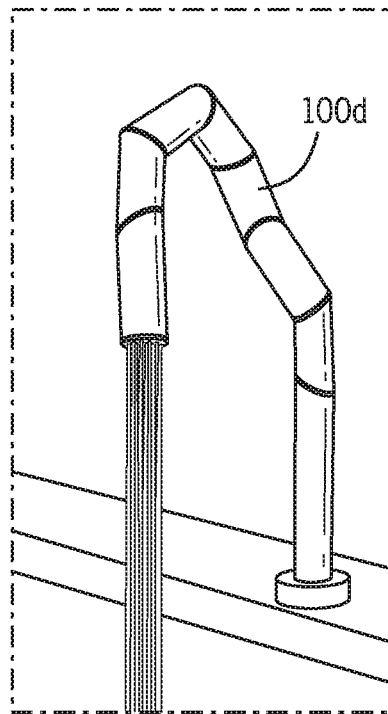
FIG. 3 is a perspective view of the faucet of FIG. 2 shown in another orientation according to another exemplary embodiment.
Figure 4:
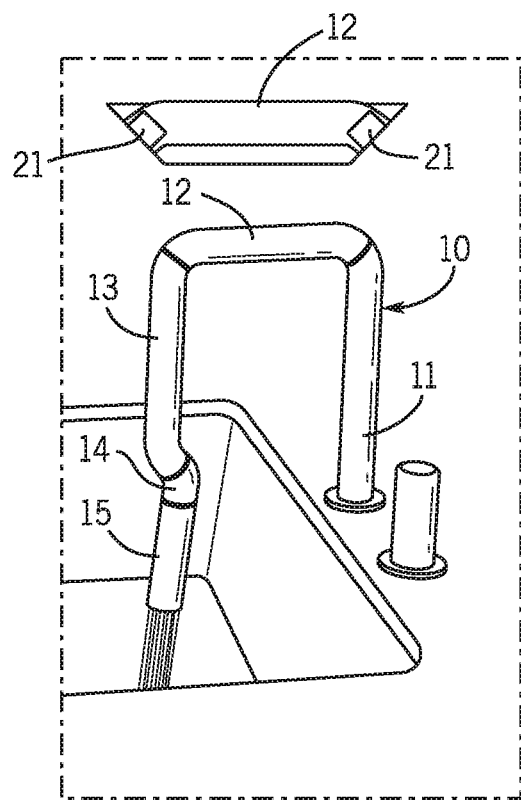
FIG. 4 illustrates a water delivery device according to another exemplary embodiment.

Referring to FIGS. 1-3, a water delivery device, shown as a faucet, includes a plurality of magnetic joints according to an exemplary embodiment. FIGS. 1-3 illustrate the same faucet in various orientations. FIG. 1 illustrates a faucet 100*a* shown in a first orientation and a faucet 100*b* shown in a second orientation that is different from the first orientation. The faucet 100*a* includes a base 105*a* and a spout 120*a* defined by a plurality of conduit sections 125*a* each rotatably coupled to each other by a magnetic joint. According to an exemplary embodiment, the plurality of conduit sections 125*a* are substantially rigid. Each of the plurality of conduit sections 125*a* can be selectively (e.g., manually or automatically) moved by rotating one or more of the conduit sections 125*a* relative to the base 105*a*, or relative to an adjacent conduit section 125*a*, so as to change the orientation or shape of the spout 120*a*. According to the exemplary embodiment shown in FIG. 1, the faucet 100*a* can be reconfigured or reoriented to the second orientation, shown as faucet 100*b* in FIG. 1. Similarly, the faucet 100*a* or 100*b* can be reconfigured to a third orientation, shown as faucet 100*c* in FIG. 2, or to a fourth orientation, shown as faucet 100*d* in FIG. 3. Although only four different faucet orientations are illustrated in FIGS. 1-3, it is appreciated that the faucet can be reconfigured or reoriented to a plurality of other orientations not shown.

As shown in FIGS. 1-3, each of the conduit sections 125*a* has a tapered or angled interface (e.g., joint, end, etc.) where the adjacent conduit sections meet, such that rotating the conduit sections 125*a* relative to each other, or relative to the base 105*a*, can change the orientation or overall shape of the spout 120*a*. For example, each conduit section 125*a* may define a longitudinal axis along its length. Thus, when rotating adjacent conduit sections 125*a* relative to each other, the angled interface between them results in changing the relative angular orientations of the longitudinal axes of adjacent conduit sections, thereby changing the relative positions of adjacent conduit sections. According to an exemplary embodiment, the conduit sections 125*a* have an oval cross-sectional shape, such that the angled or tapered end at the joint interface between adjacent conduit sections has a circular cross-sectional shape. This can, advantageously, allow for an annular arrangement of magnets at the joint interface to provide for uniform spacing between the individual magnets of each magnetic joint.

Referring to FIGS. 4-7, a water delivery device 10 is shown as a faucet according to another exemplary embodiment. As shown, water delivery device 10 includes a plurality of conduit sections 11, 12, 13, 14, and 15 that are rotatably coupled to each other. Conduit sections 11-15 are each substantially rigid and have an oval cross-sectional shape. The conduit section 11 defines a base of the water delivery device 10, and is configured to be coupled to a mounting surface (e.g., a countertop, a sink, etc.). The conduit section 11 can pivot or swivel about a central axis defined by the conduit section 11 relative to the mounting surface. According to an exemplary embodiment, the conduit section 11 includes a waterway or fluid conduit disposed therein that can swivel, so as to allow for articulation of the conduit section 11. Similarly, the conduit section 15 defines a free end or outlet end of the water delivery device 10, and is also configured to swivel or pivot about a central axis defined by the conduit section 15. The plurality of conduit sections 11-15 each include a central opening for receiving one or more fluid conduits therein for communicating fluid from a fluid supply source to an end user (e.g., hot and cold water supplies, etc.).

Still referring to FIGS. 4-7, each of the conduit sections 11-14 includes an elbow portion (e.g., bent portion, angular portion, etc.) located near the ends of each conduit section that defines an angled interface between adjacent conduit sections (e.g., 45 degree interface, etc.), so as to allow for reconfiguration of the water delivery device 10. For example, each of the conduit sections 11-14 can be selectively rotated or articulated relative to an adjacent conduit section between a plurality of rotational positions that are defined by a magnetic joint disposed at the end portions of each conduit section (see, for example, magnetic joint 20 in FIG. 6). In other words, each conduit section 11-14 may define a longitudinal axis along its length, and rotating adjacent conduit sections relative to each other via the magnetic joint results in changing the relative angular orientations of the longitudinal axes of adjacent conduit sections, because of the angled interface. In this manner, the orientation and configuration of the water delivery device 10 can be selectively changed to, advantageously, allow for the water delivery device 10 to discharge water at every possible location within a sink basin, as illustrated in FIG. 7 (see, for example, water delivery device configurations 10c, 10d, 10e, 10f, 10g, 10h).

Figure 5:
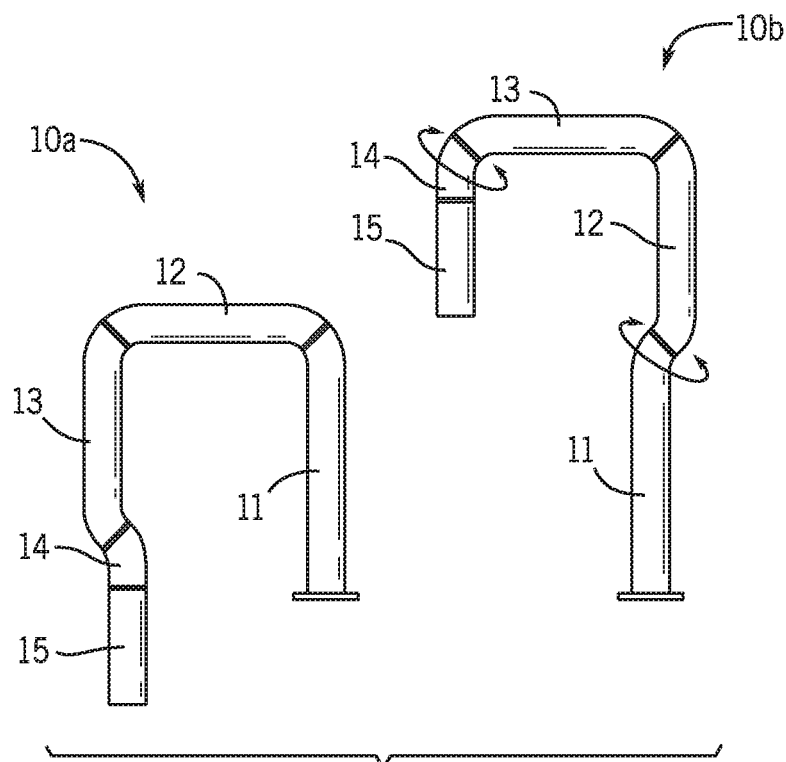
FIG. 5 illustrates the water delivery device of FIG. 4 in two different configurations.

Referring to FIG. 5, the water delivery device 10 is shown in a first configuration 10a and a second configuration 10b. Although only two configurations of the water delivery device 10 are illustrated in FIG. 5, it should be appreciated that the water delivery device 10 can be adjusted or articulated between a plurality of other configurations, as illustrated in FIG. 7, for example. The water delivery device 10 is configured to be selectively adjusted between the first configuration 10a and the second configuration 10b by selectively rotating one or more of the conduit sections of the water delivery device, such as conduit sections 11, 12, 13, or 14. The conduit sections can be rotated or articulated between a plurality of angular/rotational positions that are defined by a magnetic joint at each conduit interface, as shown schematically in FIG. 5 (e.g., conduit section 12 can be rotated (illustrated by arrows) about each of the magnetic joint assemblies 21 relative to adjacent conduit sections 11 and 13, respectively). In this manner, for example, the free end of the last conduit section 15 (i.e., the outlet end of the water delivery device 10) can be moved between a first height shown in the first configuration 10a and a second height shown in the second configuration 10b, which can, advantageously, allow for the water delivery device to fill different sized containers or rinse various items within a sink basin.

Figure 6:
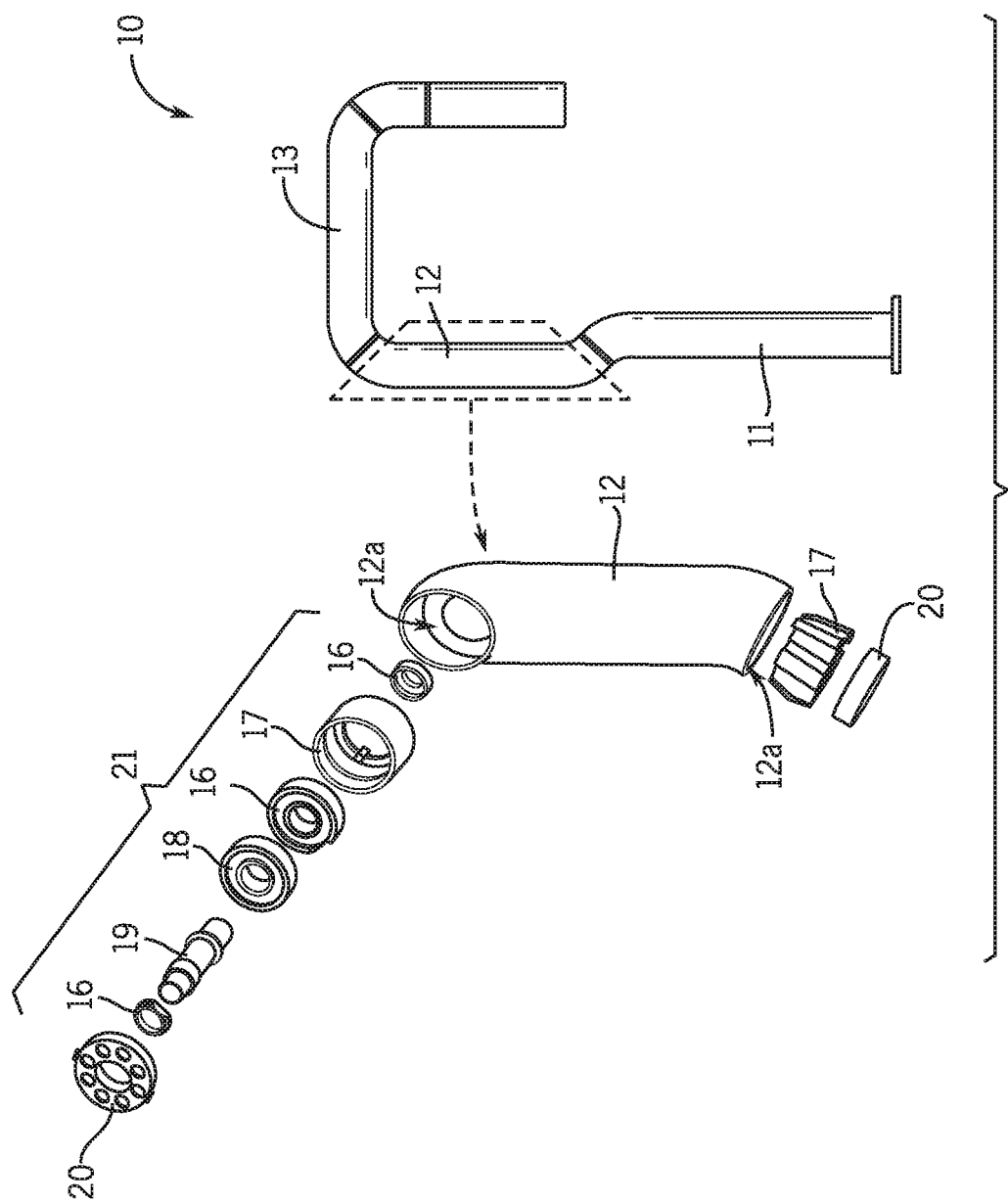
FIG. 6 is an exploded view of a conduit section of the water delivery device of FIG. 4 according to an exemplary embodiment.

Referring to FIG. 6, an exploded view of conduit section 12 is shown according to an exemplary embodiment. As shown, conduit section 12 includes a central opening for receiving a fluid conduit therein (e.g., a waterway tube, etc.) to allow for fluid communication between adjacent conduit sections. Conduit section 12 is rotatably coupled to adjacent conduit sections 11 and 13 at opposite ends of conduit section 12 by a magnetic joint assembly 21. The magnetic joint assembly 21 can be coupled at the ends of each of the conduit sections 11, 13, 14, and 15, so as to allow for articulation of the conduit sections relative to each other. As shown in FIG. 6, the magnetic joint assembly 21 includes a body 17 (e.g., sleeve, housing, etc.) having a generally hollow, cylindrical shape. The body 17 is configured to be received within openings 12a located at each end or each elbow portion of the conduit section 12. One or more bearings 18 are disposed within the body 17, and are configured to allow for relative rotational movement between the conduit section 12 and adjacent conduit sections 11 and 13.

A magnetic joint member 20 (e.g., a first member, etc.) is coupled to the body 17, and defines a plurality of angular or rotational positions for the conduit section 12 relative to adjacent conduit sections 11 and 13. The magnetic joint member 20 is configured to interact with, and selectively magnetically bias toward or away from, a similar magnetic joint member (e.g., a second member, etc.) disposed in adjacent conduit sections 11 and 13, so as to change the relative orientation of the conduit section 12 and adjacent conduit sections 11 and 13.

Figure 19:
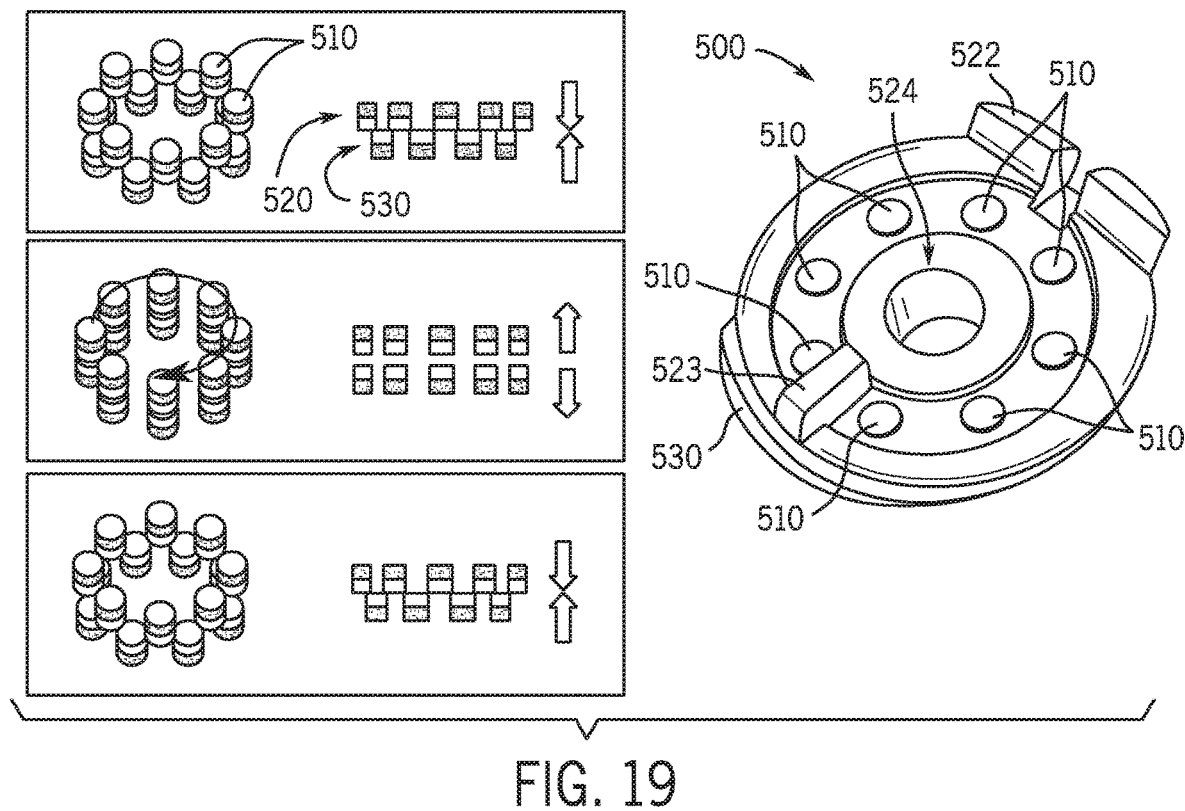
FIG. 19 illustrates the polarity and interaction of the magnetic members of a magnetic joint for use in a conduit section according to an exemplary embodiment.
Figure 20:
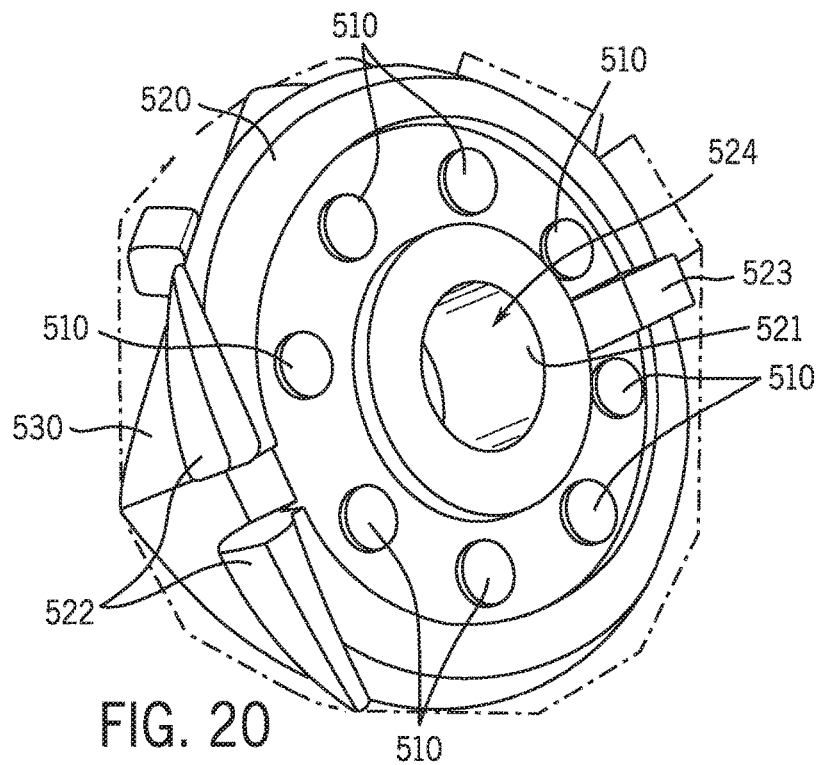
FIGS. 20-23 are perspective views of a magnetic joint according to an exemplary embodiment.
Figure 21:
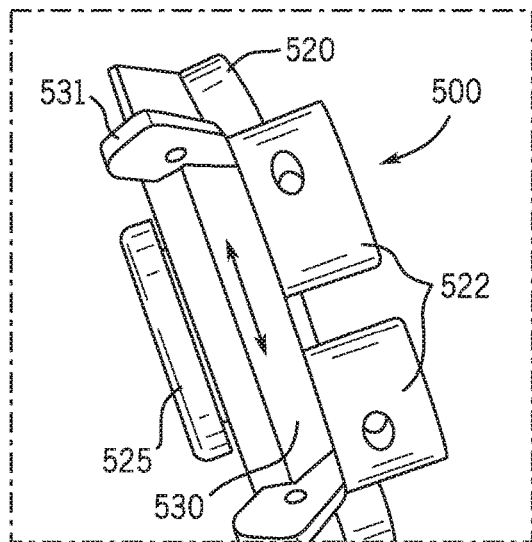
Figure 22:
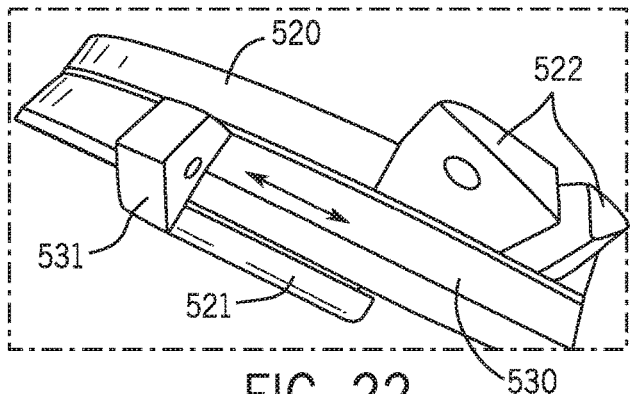
Figure 23:
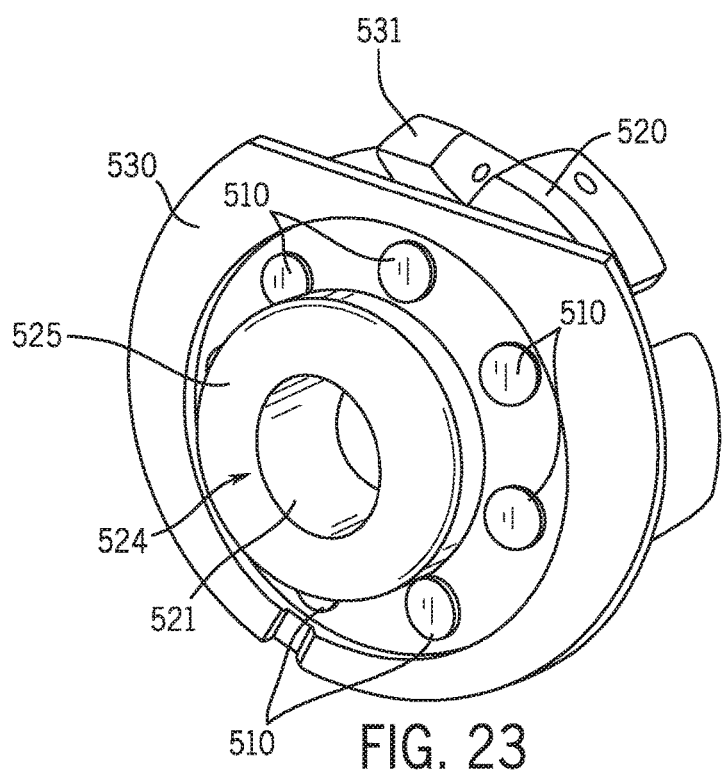

For example, referring to FIG. 19, the magnetic joint member 20 of FIG. 6 can be configured the same as members 520, 530 of a magnetic joint 500 shown in FIG. 19, according to an exemplary embodiment. As shown in FIG. 19, the magnetic joint 500 includes a magnet array defined by a plurality of magnetic members 510 (e.g., magnets, etc.) each having a north-south polarity. The magnetic joint 500 is cooperatively defined by a first member 520 including a first plurality of magnetic members 510 that are arranged on a facing surface of the first member to have their south polarity facing toward the south polarity of a second plurality of magnetic members 510 arranged on a facing surface of a second member 530. The first member 520 and the second member 530 can be rotatably coupled to each other and can cooperatively define the magnetic joint. For example, the first member 520 can be coupled to, or integrally formed with, an end of the conduit section 12, and the second member 530 can be coupled to, or integrally formed with, an end of an adjacent conduit section 11 or 13. In this way, when the second member 530 is rotated relative to the first member 520, or vice versa, the magnetic members 510 on each member will repel each other (i.e., bias away from each other) when directly facing or substantially overlapping each other, but will attract each other (i.e., bias toward each other) when the magnetic members 510 substantially overlap the spaces between the magnetic members 510 on the opposite member due to the opposite north-south polarities in these regions. Thus, the spaces between the plurality of magnetic members 510 on each member define a plurality of rotational positions or detents to hold or rotationally bias the two members relative to each other, to thereby change the relative orientation/position of the conduit sections.

According to an exemplary embodiment, the magnet arrays of the magnetic joint 20 for each conduit section include the same number of magnetic members and can be spaced apart the same distance on each array. According to an exemplary embodiment, the magnetic joint 20 includes at least eight magnetic members. According to other exemplary embodiments, the number of, and spacing of, the magnetic members on each of the magnetic joints of the water delivery device 10 is different, depending on the relative position of each magnetic joint. According to various exemplary embodiments, the spacing and the polarity of the magnetic members can be arranged to define a plurality of rotational positions for setting a relative rotational position of the various conduit sections, the details of which are discussed in the paragraphs that follow.

Referring to FIG. 6, a waterway 19 (e.g., tube, connector, etc.) is disposed through a central portion of the magnetic joint 20, the one or more bearings 18, and the body 17, and is configured to fluidly couple the conduit section 12 to adjacent conduit sections 11 and 13. For example, the waterway 19 can, advantageously, couple a fluid conduit disposed in the conduit section 12 to a fluid conduit disposed in adjacent conduit sections 11 and 13 via couplers 16 (e.g., fasteners, etc.) at opposite ends of the waterway 19. In this way, the waterway 19 can allow for fluid communication between conduit section 12 and adjacent conduit sections 11 and 13, while permitting relative rotational movement between these conduit sections via the magnetic joints 20.

Referring to FIGS. 8-9, a faucet 100 is shown according to another exemplary embodiment. The faucet 100 includes a base 120, a first conduit section 110, and a second conduit section 130. According to an exemplary embodiment, the base 120 is configured to be coupled to a support surface, such as a countertop or the like. The first conduit section 110 and the second conduit section 130 are configured to be rotated relative to each other and relative to the base 120, so as to selectively reconfigure the shape of the faucet 100. As shown in FIG. 8, the base 120 includes a hollow interior defining a flow channel for fluid to flow through. The base 120 includes part of a first magnetic joint 121a including a first magnet array 122 having a plurality of magnetic members 113. The base 120 further includes an opening 123 defined by a wall 124. The base 120 is configured to be fixed relative to the first conduit section 110 and the second conduit section 130.

The first conduit section 110 is rotatably coupled to the base 120 at the first magnetic joint 121a via a protrusion 111. As shown in FIG. 8, the protrusion 111 is received in the opening 123, and is rotatably coupled to the wall 124 via a flange 112. The first conduit section 110 is configured to rotate relative to the base 120 via the protrusion 111 about an axis "A" defined by the opening 123. The protrusion 111 includes a hollow interior to allow for a flow of water to pass through from the base 120 to an interior of the first conduit section 110. In other words, the protrusion 111 fluidly couples the base 120 to the first conduit section 110. The first conduit section 110 further includes a second magnet array 114 having a plurality of magnetic members 113. The second magnet array 114 is positioned on a plane parallel to, and offset from, the first magnet array 122. The first magnet array 114 and the second magnet array 122 cooperatively define the first magnetic joint 121a of the assembly.

Still referring to FIG. 8, the second conduit section 130 is rotatably coupled to the first conduit section 110 at an end opposite to the first magnetic joint 121a at a second magnetic joint 121b via a protrusion 131. The protrusion 131 is received in an opening 115 defined by a wall 116 of the first conduit section 110. The protrusion 131 is rotatably coupled to the wall 116 via a flange 132. The first conduit section 110 is configured to rotate relative to the second conduit section 130, and vice versa, via the protrusion 131 about an axis "B" defined by the opening 115. The axis B is oriented at an angle that is different than the orientation of axis A (e.g., 90 degrees relative to each other, etc.), such that rotation of the first conduit section 110 and/or of the second conduit section 130 relative to each other, or relative to the base 120, results in a change of orientation of the entire assembly. The protrusion 131 includes a hollow interior to allow for a flow of water to pass through from the first conduit section 110 to an interior of the second conduit section 130, and to an outlet 131 located at a distal end of the second conduit section 130. The second magnetic joint 121b includes a third magnet array 114b having a plurality of magnetic members 113. The third magnet array 114b is positioned on a plane parallel to, and offset from, a fourth magnet array 132 located at an end of the second conduit section 130. The third magnet array 114b and the fourth magnet array 132 cooperatively define the second magnetic joint 121b of the assembly.

According to an exemplary embodiment, the various magnet arrays of the fir t and second magnetic joints 121a, 121b have the same number of magnetic members and can be spaced apart the same distance on each array. According to an exemplary embodiment, the first magnetic joint 121a and the second magnetic joint 121b can include at least eight magnetic members. According to other exemplary embodiments, the number of, and spacing of, the magnetic members on each of the magnetic joints is different. According to various exemplary embodiments, the spacing and the polarity of the magnetic members can be arranged to define a plurality of rotational positions for setting a relative rotational position of the various conduit sections (e.g., conduit sections 110, 130, etc.).

Figure 11:
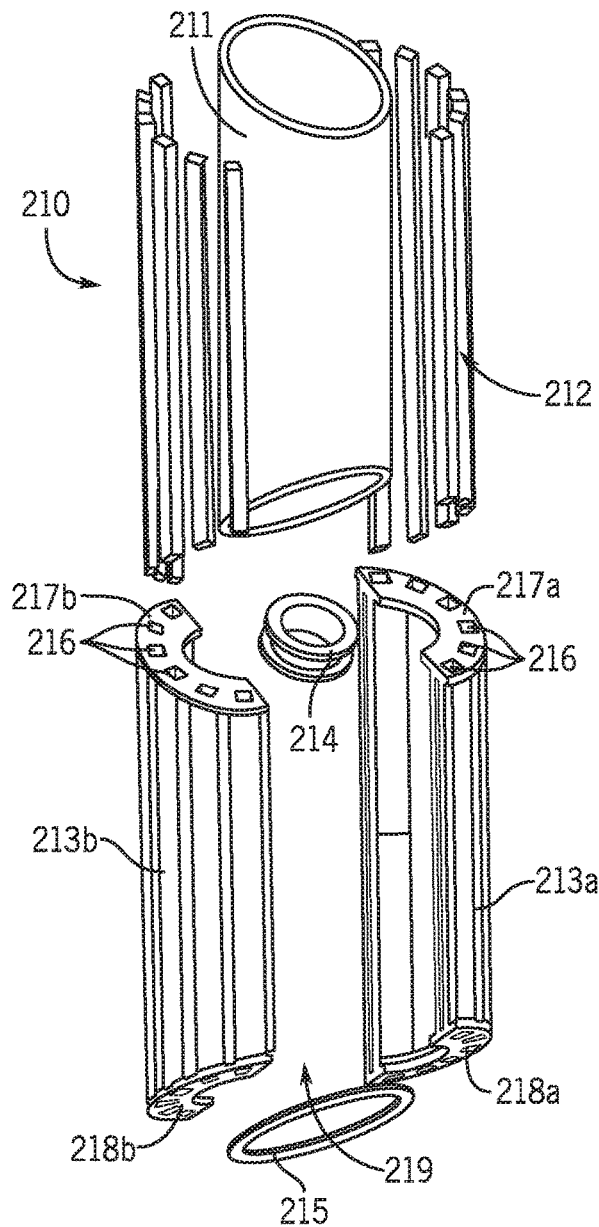
FIG. 11 is an exploded view of the conduit section of FIG. 10.

For example, referring to FIG. 19, the magnetic members 113 of the various magnet arrays described above can be configured or arranged the same as the magnetic members 510 shown in FIG. 11. As shown in FIG. 19, the magnetic members 510 each have a north-south polarity. A first member 520 includes a first plurality of magnetic members 510 that are arranged to have their south polarity facing toward the south polarity of a second plurality of magnetic members 510 located on a second member 530. The first member 520 and the second member 530 can cooperatively define a magnetic joint. In this way, when the second member 530 is rotated relative to the first member 520, the magnetic members 510 will repel each other (i.e., bias away from each other) when substantially overlapping (e.g., directly facing, etc.) each other on the two members, but will attract each other (i.e., bias toward each other) when the magnetic members 510 substantially overlap the spaces between the magnetic members due to the opposite north-south polarities in these regions. Thus, the spaces between the plurality of magnetic members 510 on each member define a plurality of angular positions to hold or rotationally bias the two members relative to each other.

In this manner, the magnetic joints 121a, 121b can allow for the selective repositioning of the first conduit section 110 and/or the second conduit section 130 relative to each other or relative to the base 120, so as to reconfigure the shape of the faucet 100. This can, advantageously, allow for the faucet 100 to fill various containers, provide access for cleaning various kitchen accessories (e.g., pots, pans, etc.), provide clearance around other structures or appliances where the faucet is installed, or change the overall aesthetic appearance of the faucet.

Figure 10:
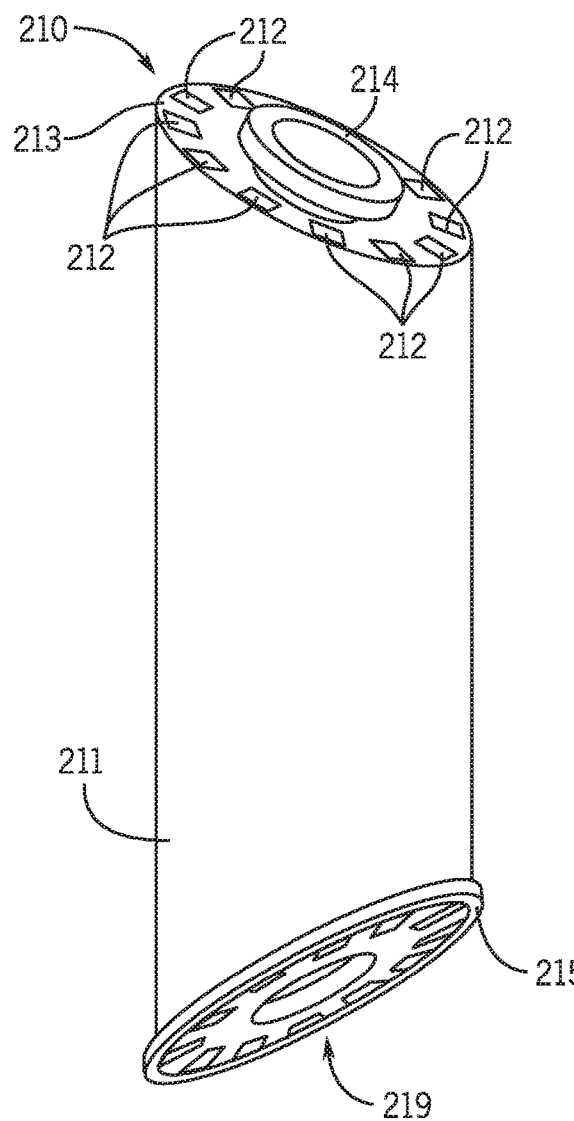
FIG. 10 is a perspective view of a conduit section for use in a fluid delivery device according to an exemplary embodiment.

Referring to FIGS. 10-11, a conduit section 210 is shown according to another exemplary embodiment. In this exemplary embodiment, the conduit section 210 includes an outer sleeve 211, a first body half 213a, a second body half 213b, a plurality of magnetic members 212, a bushing 214, and a seal 215. The first body half 213a and the second body half 213b each include a plurality of openings or sleeves 216 for receiving a plurality of magnetic members 212 therein. As shown in the embodiment of FIG. 11, the first and second body halves 213a and 213b each include six sleeves 216 arranged circumferentially about a center axis of each body half. According to other exemplary embodiments, the body halves 213a, 213b can include a different number of sleeves for receiving a different number of magnetic members 212. Each of the sleeves 216 is spaced equidistant relative to each other along the circumference of each body, according to an exemplary embodiment, although other alternative spacing is contemplated. The first body half 213a and the second body half 213b each have a generally half-cylinder shape. The first body half 213a is configured to be coupled to the second body half 213b (e.g., via adhesive, ultrasonic welding, etc.) to define a single, unitary body 213 including a central opening 219 (see FIG. 10). The two body halves 213a, 213b are configured to be coupled to each other with the bushing 214 disposed therebetween at an upper and/or lower portion thereof. At least a portion of the bushing 214 is disposed above an end of the body 213, and is configured to rotatably couple two conduit sections together (see, for example, FIGS. 12-14). In addition, the bushing 214 includes a central opening to fluidly couple two conduit sections together (i.e., to allow a flow of fluid to pass between two adjacent conduit sections).

Still referring to FIGS. 10-11, the first body half 213a includes an upper end surface 217a and a lower end surface 218a. The upper end surface 217a and the lower end surface 218a are each oriented at different angles relative to each other (e.g., 90 degrees, etc.). In other words, the upper end surface 217a and the lower end surface 218a are not parallel to each other. Likewise, the second body half 213b includes an upper end surface 217b and a lower end surface 218b. The upper end surface 217b is oriented at the same angle as the upper end surface 217a of the first body half 213a, and the lower end surface 217b is oriented at the same angle as the lower end surface 217a, to thereby define upper and lower coplanar surfaces of the unitary body 213 (e.g., when the first and second body halves 213a, 213b are coupled together). In this way, rotation of the conduit section 210 relative to another adjacent conduit section 210, or relative to a fixed base (e.g., base 120, etc.), will change the orientation or overall shape of the assembly. According to an exemplary embodiment, the conduit section 210 has an oval cross-sectional shape, such that the angled end surfaces have a circular cross-sectional shape. This can, advantageously, allow for an annular array of magnetic members 212 at the end surfaces to provide for uniform spacing between the individual magnetic members.

As shown in the embodiment of FIGS. 10-11, each of the magnetic members 212 is disposed in a sleeve 216 of the body 213. At least a portion of each of the magnetic members 212 is exposed at the upper end surface 217 and at the lower end surface 218. According to an exemplary embodiment, each of the magnetic members 212 is substantially flush with the upper end surface 217 and the lower end surface 218 of the body 213. In this way, the upper end surface 217 and the lower end surface 218 can define part of an upper magnetic joint and a lower magnetic joint of the conduit 210, respectively. The upper magnetic joint and the lower magnetic joint can, advantageously, allow for a plurality of conduit sections 210 to be rotatably coupled together.

Figure 12:
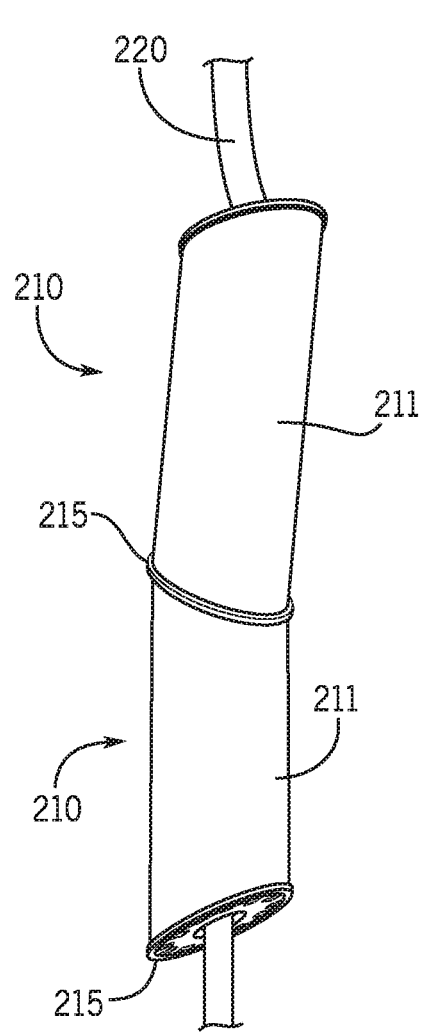
FIG. 12 is a perspective view of two conduit sections including a central conduit, according to an exemplary embodiment.
Figure 13:
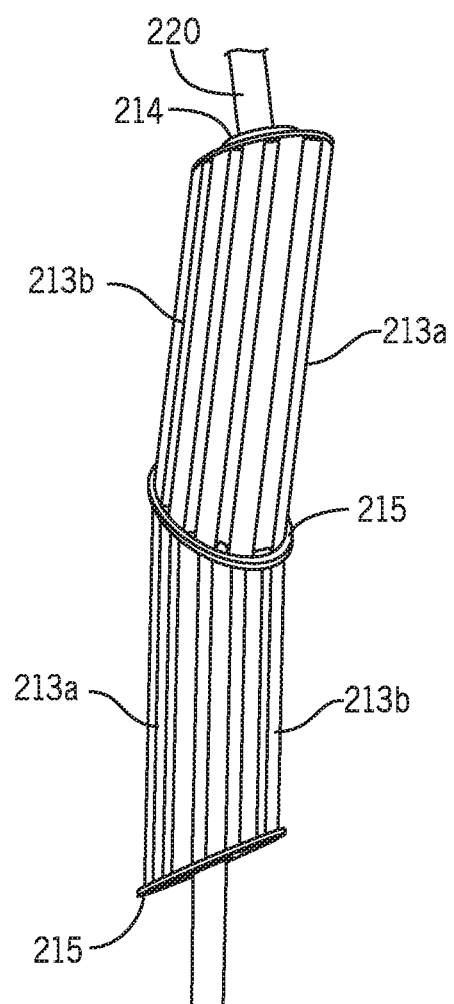
FIG. 13 is a perspective view of the two conduit sections of FIG. 12 shown with the outer cover removed.
Figure 14:
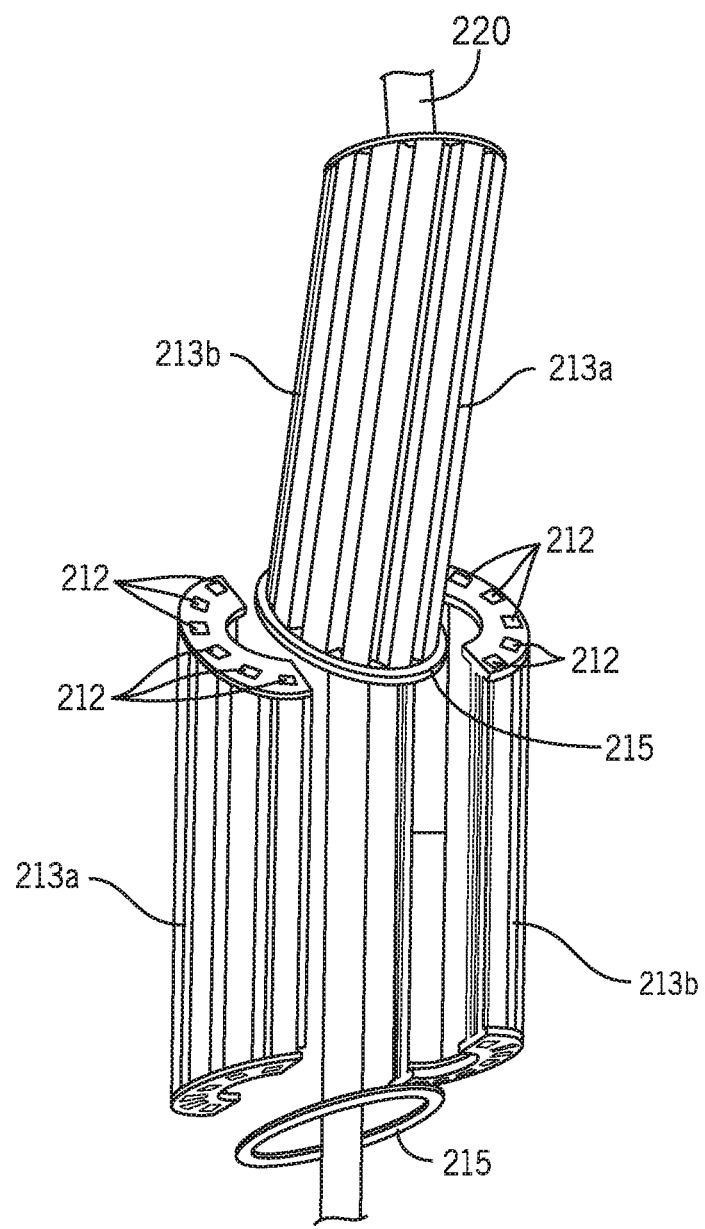
FIG. 14 is a partial exploded view of the two conduit sections of FIG. 13.

For example, as shown in FIGS. 12-14, at least two conduit sections 210 are rotatably coupled to each other to define, for example, part of a faucet assembly or a similar water delivery device. A fluid conduit 220 (e.g., tube, etc.) is disposed through the central opening 219 of each conduit section 210 to allow for a flow of fluid to pass therethrough. The seal 215, shown as an O-ring according to an exemplary embodiment, can sealingly engage two conduit sections 210 at an interface of the two conduit sections 210. As shown in FIGS. 12-14, the two conduit sections 210 are rotatably coupled to each other via the bushing 214, and can be selectively rotated between a plurality of angular positions defined by a magnetic joint of the assembly. The magnetic joint is cooperatively defined by a lower end surface 217 of the upper conduit section 210 and an upper end surface of the lower conduit section 210. According to various exemplary embodiments, the spacing and the polarity of the magnetic members 212 at the upper and lower end surfaces of the adjacent conduit sections can be arranged to define the plurality of angular positions for setting or holding the two conduit sections 210 relative to each other.

For example, according to an exemplary embodiment, the magnetic members 212 on one of the conduit sections 210 can be arranged to have an opposite polarity to the magnetic members on the adjacent conduit section 210, such that the two conduit sections can be magnetically coupled or biased toward each other by an attractive magnetic force when the magnetic members on the two conduit sections are facing each other at the magnetic joint interface. According to another exemplary embodiment, the magnetic members 212 can be arranged to have the same polarity when facing each other, such that the magnetic members 212 repel each other or bias away from each other when rotated directly above or substantially overlapping an opposite magnet on the adjacent conduit section, but can attract each other or bias toward each other when the magnetic members 512 substantially overlap the spaces between the magnetic members 212 on the end surfaces (e.g., due to the opposite polarity in those regions of the magnetic joint interface). According to various exemplary embodiments, the conduit sections 210 do not physically contact each other at the magnetic interface of the two conduit sections, so as to minimize the amount of friction at the joint interface. In this way, rotation of the two conduit sections relative to each other provides a smoother tactile response and requires less effort by a user and/or by an actuator (e.g., an electromagnetic actuator, etc.), as compared to conventional mechanical joints.

Figure 15:
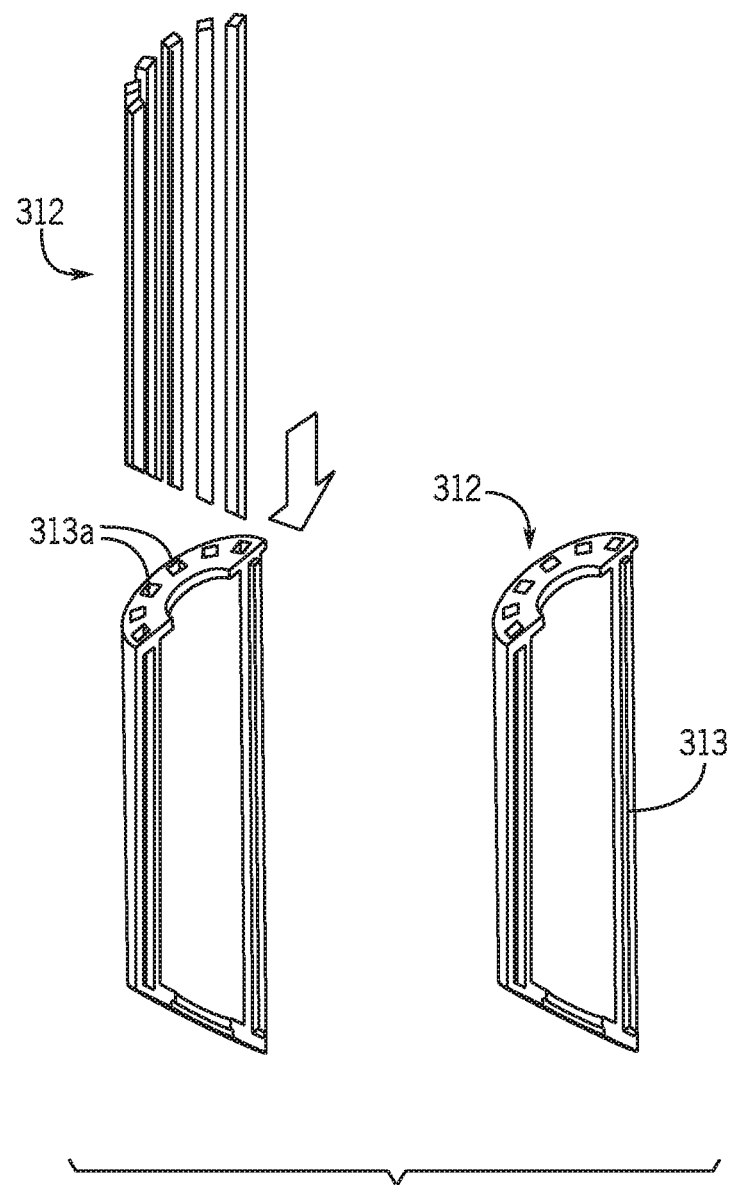
FIG. 15 illustrates a method of inserting magnetic members into a conduit section according to an exemplary embodiment.

Referring to FIG. 15, a body half 313 for a conduit section is shown including a plurality of sleeves 313a for receiving a plurality of magnetic members 312, according to another exemplary embodiment. The body half 313 and the magnetic members 312 are identical to the body half 213b and the magnetic members 212 of FIGS. 10-14. The plurality of magnetic members 312 can each be arranged to have their north polarity facing upward and their south polarity facing downward prior to being inserted into each of the sleeves 313a of the body half 313. Each of the magnetic members 312 can have their end surfaces compound angle cut to match the angles of the corresponding end surfaces of the body half 313, such that the ends of the magnetic members 312 are substantially flush with the end surfaces of the body half 313. This can, advantageously, allow for more consistent rotation and magnetic holding of the conduit section relative to other conduit sections. According to another exemplary embodiment, the precut magnetic members 312 can be insert molded with the body half 313.

Figure 16:
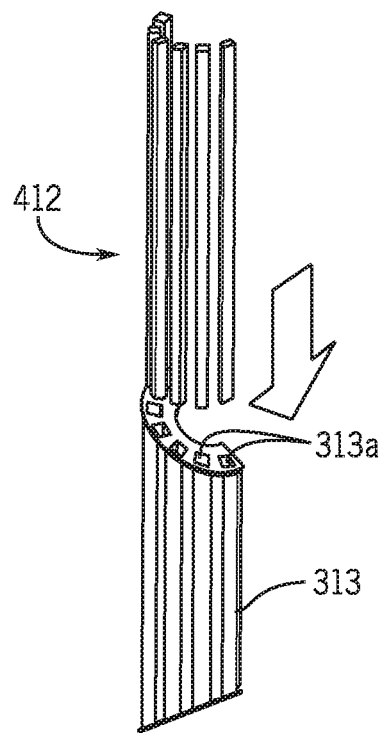
FIGS. 16-18 illustrate a method of assembling magnetic members into a conduit section according to another exemplary embodiment.
Figure 17:
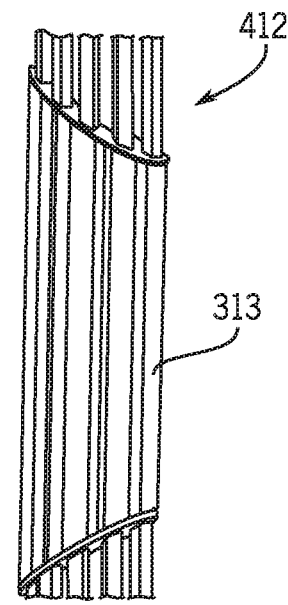
Figure 18:
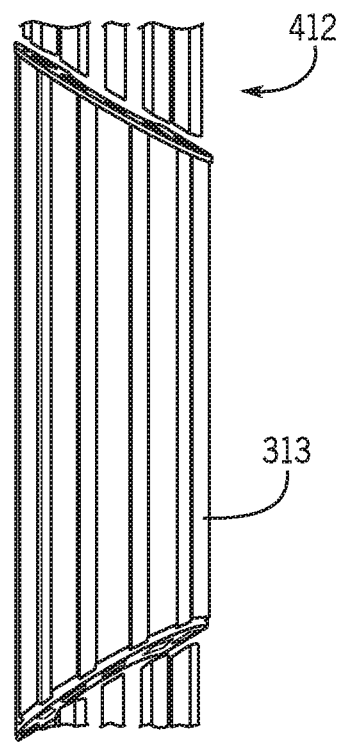

According to another exemplary embodiment shown in FIGS. 16-18, a plurality of uncut magnetic members 412 are first inserted into each of the sleeves 313a of the body half 313. The plurality of magnetic members 412 can then have their end surfaces compound angle cut to match the angles of the corresponding end surfaces of the body half 313 after the magnetic members are inserted in the body half 313, such that the ends of the magnetic members 412 are substantially flush with the end surfaces of the body half 313. According to other exemplary embodiments, the uncut magnetic members 412 can be insert molded with the body half 313, and then cut after molding and curing of the body half 313.

Referring to FIGS. 19-23, a magnetic joint 500 is shown according to an exemplary embodiment. The magnetic joint 500 can be used as a joint interface for rotatably coupling a plurality of adjacent conduit sections of a water delivery device, such as, for example, first conduit section 110 and third conduit section 130. According to other exemplary embodiments, the magnetic joint 500 can be used in other types of fluid conduits, plumbing assemblies, or other types of devices where it is desirable to rotatably couple one or more members together to, for example, allow for the selective repositioning of the members relative to each other.

As shown in the embodiment of FIGS. 19-23, the magnetic joint 500 includes a first member 520 and a second member 530. According to an exemplary embodiment, the first member 520 can be coupled to, or integrally formed with, an end of a conduit section (e.g., conduit section 12, 110, 130, etc.). Similarly, the second member 530 can be coupled to, or integrally formed with, an end of a second, adjacent conduit section. For example, the first member 520 includes a plurality of tabs 522, 523 for coupling (e.g., inserting, etc.) the first member 520 to another member, such as a portion of a first conduit section (e.g., conduit section 12, 110, 130, etc.). Similarly, the second member 530 includes one or more tabs 531 for coupling the second member 530 to another adjacent member, such as a portion of a second conduit section. The first member 520 includes a central passage 524 defined by a protrusion 521 extending from the first member 520. The central passage 524 can, for example, permit a flow of fluid to pass between two adjacent conduit sections. The protrusion 521 has a substantially cylindrical shape, and is configured to rotatably couple the first member 520 to the second member 530. The protrusion 521 includes a flange portion 525 for retaining the second member 530 to the first member 520 in an axial direction. According to an exemplary embodiment, the first member 520 and the second member 530 only physically contact each other at the protrusion 521, but are otherwise spaced apart (e.g., offset, etc.) from each other (see, for example, FIG. 22).

Still referring to FIGS. 19-23, the first member 520 and the second member 530 are each configured to be selectively rotated relative to each other between a plurality of angular or rotational positions that are defined by a plurality of magnetic members 510. The magnetic members 510 have a circular arrangement on each of the first member 520 and the second member 530. According to the exemplary embodiment shown, the magnetic members 510 are spaced equidistant from each other, and eight magnetic members are disposed on each of the first and second members 520, 530. According to other exemplary embodiments, there are a different number of magnetic members 510 on the first member 520 and/or the second member 530. According to various exemplary embodiments, the spacing and the polarity of the magnetic members 510 on the first and second members 520, 530 can be arranged to define a plurality of angular positions for setting or holding the two members relative to each other.

For example, according to an exemplary embodiment, the magnetic members 510 on the first member 520 can be arranged to have an opposite polarity facing the magnetic members on the second member 530, such that the two members can be magnetically coupled or biased toward each other by an attractive magnetic force when the magnetic members on the two members are facing each other. According to another exemplary embodiment shown in FIG. 19, the magnetic members 510 can be arranged to have the same polarity when facing each other, such that the magnetic members 510 repel each other or bias away from each other when rotated directly above or substantially overlapping an opposite magnet on the other member, but can attract each other or bias toward each other when rotated to substantially overlap the spaces between the magnetic members on the two members (e.g., due to the opposite polarity in those regions of the magnetic joint). According to an exemplary embodiment, the first member 520 only physically contacts the second member 530 at the protrusion 531. In other words, the two members do not physically contact each other at the magnetic members 510, so as to minimize the amount of friction at the joint interface. In this way, rotation of the two members relative to each other provides a smoother tactile response and requires less effort to rotate by a user and/or by an actuator (e.g., an electromagnetic actuator, etc.), as compared to a conventional mechanical joint.

The water delivery devices disclosed herein include conduit sections that can be selectively rotated relative to each other between a plurality of angular or rotational positions defined by magnetic joints, so as to selectively reorient the conduit section(s) and change the overall shape of the water delivery device. This can, advantageously, allow for increased functionality of the water delivery device to, for example, fill various containers, provide access for cleaning various kitchen accessories (e.g., pots, pans, etc.), provide clearance around other structures or appliances where the water delivery device is installed, or change the overall aesthetic appearance of the water delivery device.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein.

The invention claimed is:

1. A fluid delivery device comprising:
   a first conduit section; and
   a second conduit section rotatably coupled to the first conduit section by a magnetic joint,
   wherein the magnetic joint permits rotation of the first conduit section relative to the second conduit section and prevents axial movement of the first conduit section relative to the second conduit section during rotation,
   wherein the first conduit section and the second conduit section each have a length that defines a longitudinal axis, and
   wherein the first conduit section has an angled interface with the second conduit section such that rotation of the second conduit section relative to the first conduit section results in changing a relative angular orientation of the longitudinal axes.

2. The fluid delivery device of claim 1, further comprising a fluid conduit extending between the first conduit section and the second conduit section.

3. The fluid delivery device of claim 1, wherein the fluid delivery device is a faucet, and wherein the first and second conduit sections collectively define a spout of the faucet.

4. The fluid delivery device of claim 1, wherein the magnetic joint includes a first plurality of magnets and a second plurality of magnets, and wherein the magnetic joint further comprises:
   a first member including the first plurality of magnets spaced annularly apart from each other; and
   a second member including the second plurality of magnets spaced annularly apart from each other;
   wherein the first member is rotatably coupled to the second member; and
   wherein the first member is coupled to the first conduit section and the second member is coupled to the second conduit section.

5. The fluid delivery device of claim 4, wherein the second conduit section is configured to magnetically bias away from the first conduit section when the second plurality of magnets substantially overlap the first plurality of magnets, and wherein the second conduit section is configured to magnetically bias toward the first conduit section when the second plurality of magnets substantially overlap the spaces between adjacent magnets of the first plurality of magnets.

6. The fluid delivery device of claim 5, wherein the first plurality of magnets and the second plurality of magnets are each arranged to have the same polarity facing each other.

7. The fluid delivery device of claim 4, wherein the first plurality of magnets and the second plurality of magnets are each arranged to have alternating polarities on a facing surface of the first and second members, respectively.

8. The fluid delivery device of claim 4, wherein the first plurality of magnets and the second plurality of magnets are each spaced apart equidistant from each other on the first and second members, respectively.

9. The fluid delivery device of claim 4, wherein the first member is spaced apart from the second member such that the first plurality of magnets do not physically contact the second plurality of magnets at a plurality of rotational positions.

10. The fluid delivery device of claim 4, wherein the first member further comprises a protrusion having a hollow cylindrical shape that defines a central passage, and wherein the protrusion includes a flange portion.

11. A fluid delivery device comprising:
    a first conduit section; and
    a second conduit section rotatably coupled to the first conduit section by a magnetic joint, wherein the magnetic joint permits rotation of the first conduit section relative to the second conduit section and prevents axial movement of the first conduit section relative to the second conduit section during rotation,
    wherein the magnetic joint includes:
       a first plurality of magnets;
       a second plurality of magnets;
       a first member including the first plurality of magnets spaced annularly apart from each other; and
       a second member including the second plurality of magnets spaced annularly apart from each other, wherein the first member is rotatably coupled to the second member,
    wherein the first member is coupled to the first conduit section and the second member is coupled to the second conduit section,
    wherein the first member further comprises a protrusion having a hollow cylindrical shape that defines a central passage, the protrusion including a flange portion,
    wherein the protrusion rotatably couples the first member to the second member, and
    wherein the flange portion retains the second member to the first member in an axial direction.

12. A fluid delivery device comprising:
a first conduit section configured to be coupled to a mounting surface; and
a second conduit section rotatably coupled to the first conduit section by a magnetic joint;
wherein the magnetic joint permits rotation of the first conduit section relative to the second conduit section and prevents axial movement of the first conduit section relative to the second conduit section during rotation,
wherein the first conduit section and the second conduit section each have a length that defines a longitudinal axis, and wherein the first conduit section has an angled interface with the second conduit section such that rotation of the second conduit section relative to the first conduit section results in changing a relative angular orientation of the longitudinal axes.

13. The fluid delivery device of claim 12, wherein the magnetic joint includes a first plurality of magnets spaced annularly apart from each other on an end surface of the first conduit section and a second plurality of magnets spaced annularly apart from each other on an end surface of the second conduit section that faces the end surface of the first conduit section.

14. The fluid delivery device of claim 13, wherein the second conduit section is configured to magnetically bias away from the first conduit section when the second plurality of magnets substantially overlap the first plurality of magnets, and wherein the second conduit section is configured to magnetically bias toward the first conduit section when the second plurality of magnets substantially overlap the spaces between adjacent magnets of the first plurality of magnets.

15. The fluid delivery device of claim 14, wherein the first plurality of magnets and the second plurality of magnets are each arranged to have the same polarity facing each other.

16. The fluid delivery device of claim 13, wherein the first plurality of magnets and the second plurality of magnets are each arranged to have alternating polarities on the end surfaces of the first and second conduit sections, respectively.

17. A fluid delivery device comprising:
a first conduit section; and
a second conduit section rotatably coupled to the first conduit section by a magnetic joint;
wherein the magnetic joint is configured to define a plurality of rotational positions between the first conduit section and the second conduit section; and
wherein the magnetic joint permits rotation of the first conduit section relative to the second conduit section and prevents axial movement of the first conduit section relative to the second conduit section during rotation.

18. The fluid delivery device of claim 17, wherein the first conduit section and the second conduit section each have a length that defines a longitudinal axis, and wherein the first conduit section has an angled interface with the second conduit section such that rotation of the second conduit section relative to the first conduit section results in changing a relative angular orientation of the longitudinal axes.

19. The fluid delivery device of claim 17, wherein the magnetic joint includes a first plurality of magnets spaced annularly apart from each other on the first conduit section, a second plurality of magnets spaced annularly apart from each other on the second conduit section, and a bushing between the first plurality of magnets and the second plurality of magnets configured to maintain a fixed distance between the first conduit section and the second conduit section;
wherein the first plurality of magnets and the second plurality of magnets cooperatively define the plurality of rotational positions between the first conduit section and the second conduit section.

* * * * *